July 24, 1928. J. LEDWINKA. Re. 17,051

AUTOMOBILE BODY.

Original Filed June 17, 1914

12 SHEETS—SHEET 1.

Witnesses:
C. W. Benjamin
S. E. Darby, Jr.

Inventor
Joseph Ledwinka
By his Attorney
Samuel E. Darby

July 24, 1928. J. LEDWINKA. Re. 17,051

AUTOMOBILE BODY.

Original Filed June 17, 1914

12 SHEETS—SHEET 2.

Witnesses:
W. W. Benjamin
S. E. Darby, Jr.

Inventor
Joseph Ledwinka
By his Attorney
Samuel E. Darby

July 24, 1928. J. LEDWINKA. Re. 17,051

AUTOMOBILE BODY.

Original Filed June 17, 1914

12 SHEETS—SHEET 3.

Witnesses:
W. W. Benjamin
S. E. Darby, Jr.

Inventor
Joseph Ledwinka
By his Attorney
Samuel E. Darby

July 24, 1928. J. LEDWINKA. Re. 17,051

AUTOMOBILE BODY.

Original Filed June 17, 1914

12 SHEETS—SHEET 4.

Witnesses:
W. H. Benjamin
S. E. Darby, Jr.

Inventor
Joseph Ledwinka
By his Attorney
Samuel E. Darby

July 24, 1928. J. LEDWINKA. Re. 17,051

AUTOMOBILE BODY.

Original Filed June 17, 1914

12 SHEETS—SHEET 5.

Witnesses:
W. Benjamin
S. E. Darby, Jr.

Inventor
Joseph Ledwinka
By his Attorney
Samuel E. Darby

July 24, 1928.
J. LEDWINKA.
AUTOMOBILE BODY.
Re. 17,051
Original Filed June 17, 1914
12 SHEETS—SHEET 6.
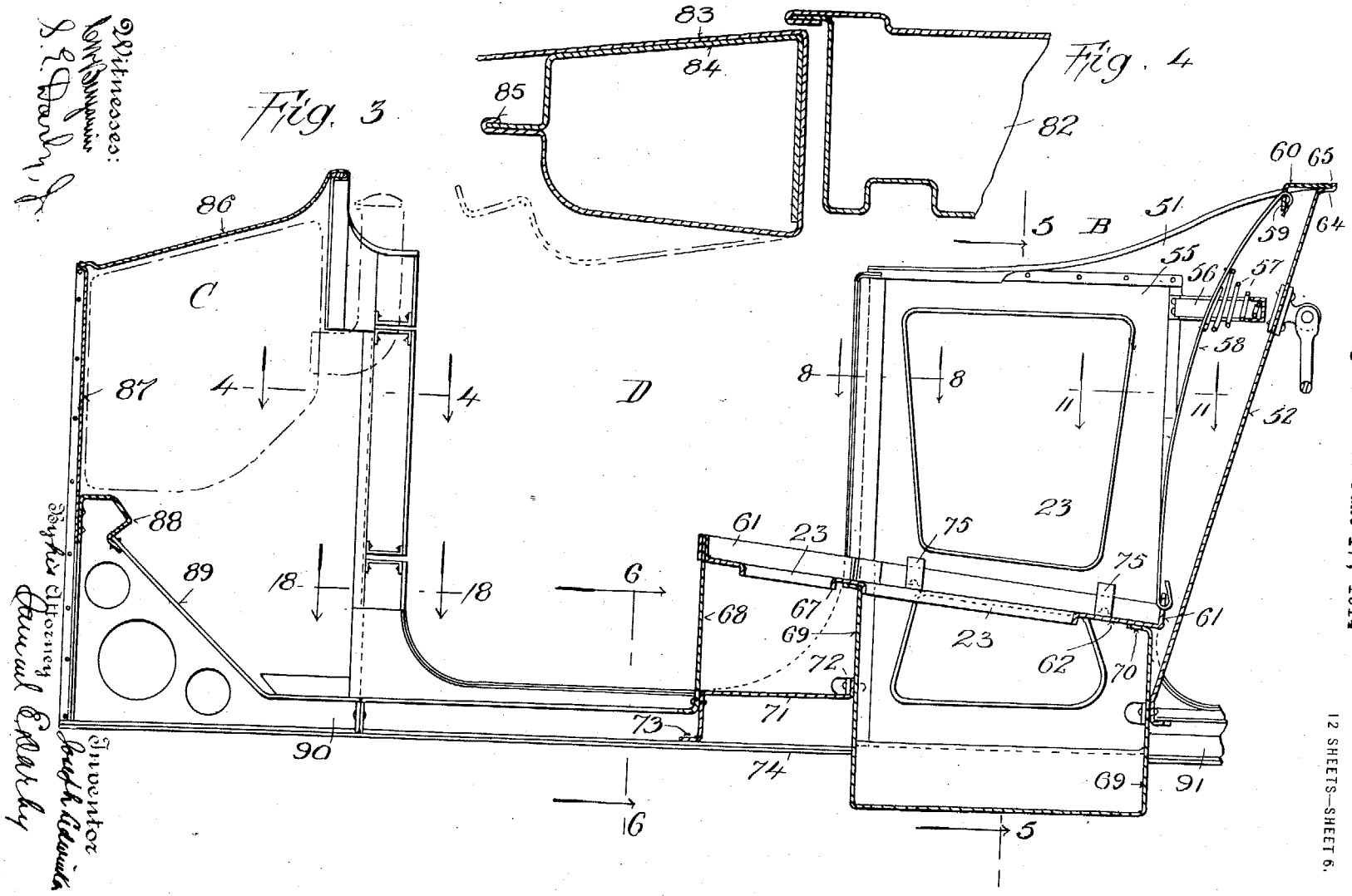
Witnesses:
W. F. Benjamin
S. E. Darby, Jr.
Inventor
Joseph Ledwinka
By his Attorney
Samuel E. Darby July 24, 1928. J. LEDWINKA. Re. 17,051

AUTOMOBILE BODY.

Original Filed June 17, 1914

12 SHEETS—SHEET 7.

Witnesses:
C. W. Benjamin
S. E. Darby, Jr.

Inventor
Joseph Ledwinka
By his Attorney
Samuel E. Darby

July 24, 1928. J. LEDWINKA. Re. 17,051
AUTOMOBILE BODY.
Original Filed June 17, 1914
12 SHEETS—SHEET 8.
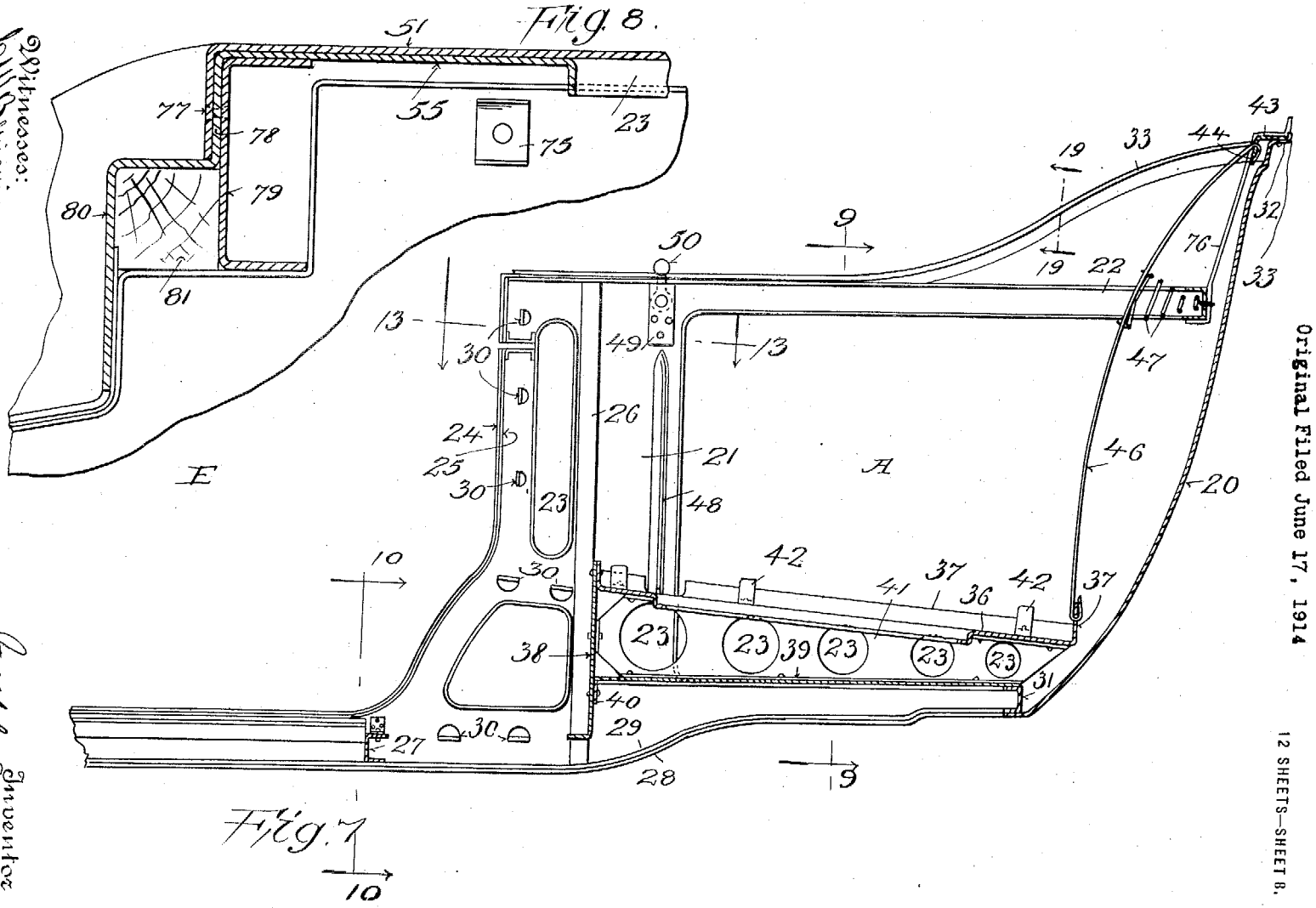
Witnesses:
C. W. Benjamin
S. E. Darby, Jr.
Inventor
Joseph Ledwinka
By his Attorney
Samuel E. Darby July 24, 1928. J. LEDWINKA. Re. 17,051

AUTOMOBILE BODY.

Original Filed June 17, 1914

12 SHEETS—SHEET 9.

Witnesses:
W. W. Benjamin
S. E. Darby, Jr.

Inventor
Joseph Ledwinka
By his Attorney
Samuel E. Darby

July 24, 1928. J. LEDWINKA. Re. 17,051

AUTOMOBILE BODY.

Original Filed June 17, 1914

12 SHEETS—SHEET 10.

Witnesses:
C. W. Benjamin
S. E. Darby, Jr.

Inventor
Joseph Ledwinka
By his Attorney
Samuel E. Darby

July 24, 1928. J. LEDWINKA. Re. 17,051
AUTOMOBILE BODY.
Original Filed June 17, 1914
12 SHEETS—SHEET 11.
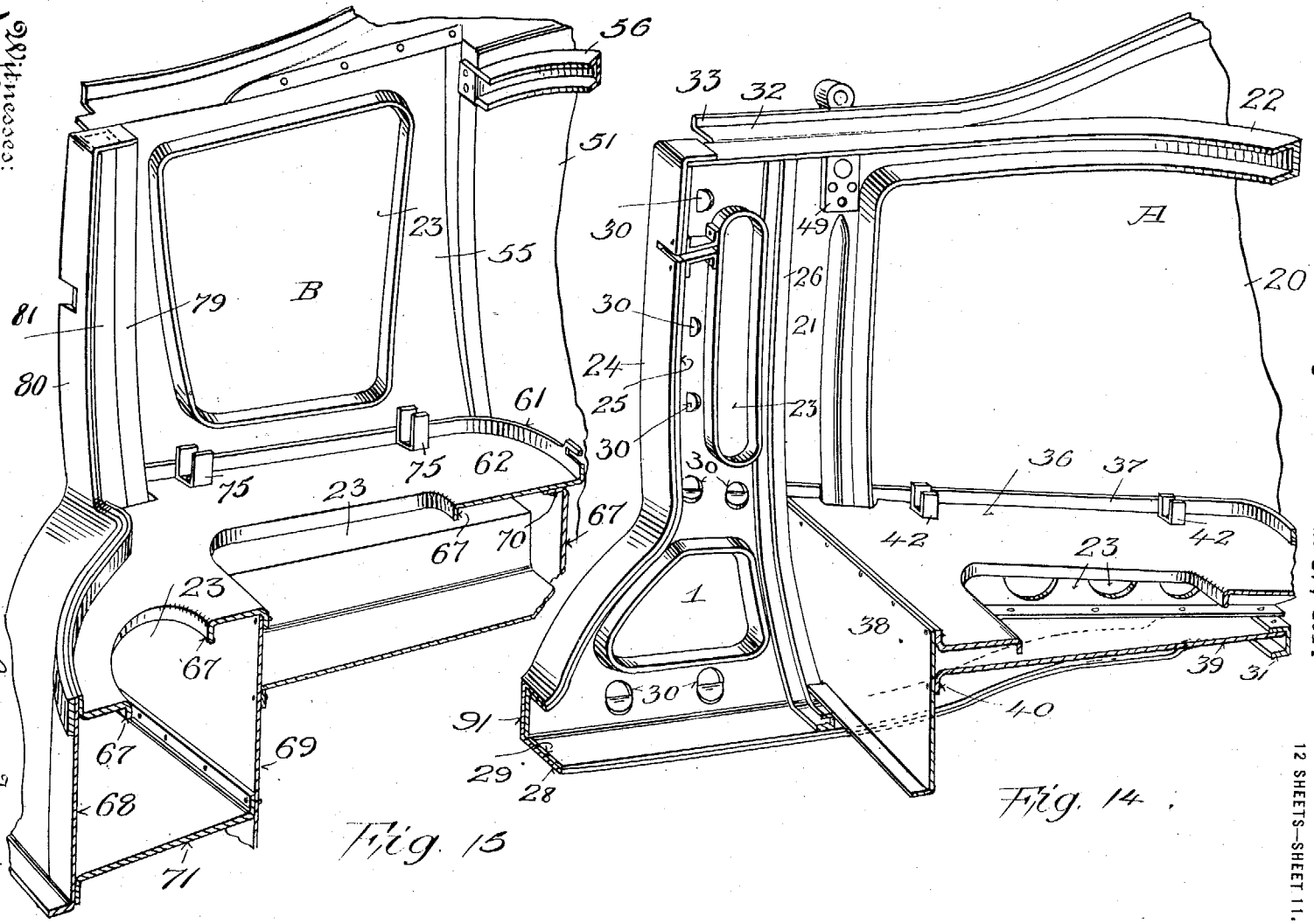
Witnesses:
D. W. Benjamin
S. E. Darby, Jr.
Inventor
Joseph Ledwinka
By his Attorney
Samuel E. Darby July 24, 1928. J. LEDWINKA. Re. 17,051
AUTOMOBILE BODY.
Original Filed June 17, 1914
12 SHEETS—SHEET 12.
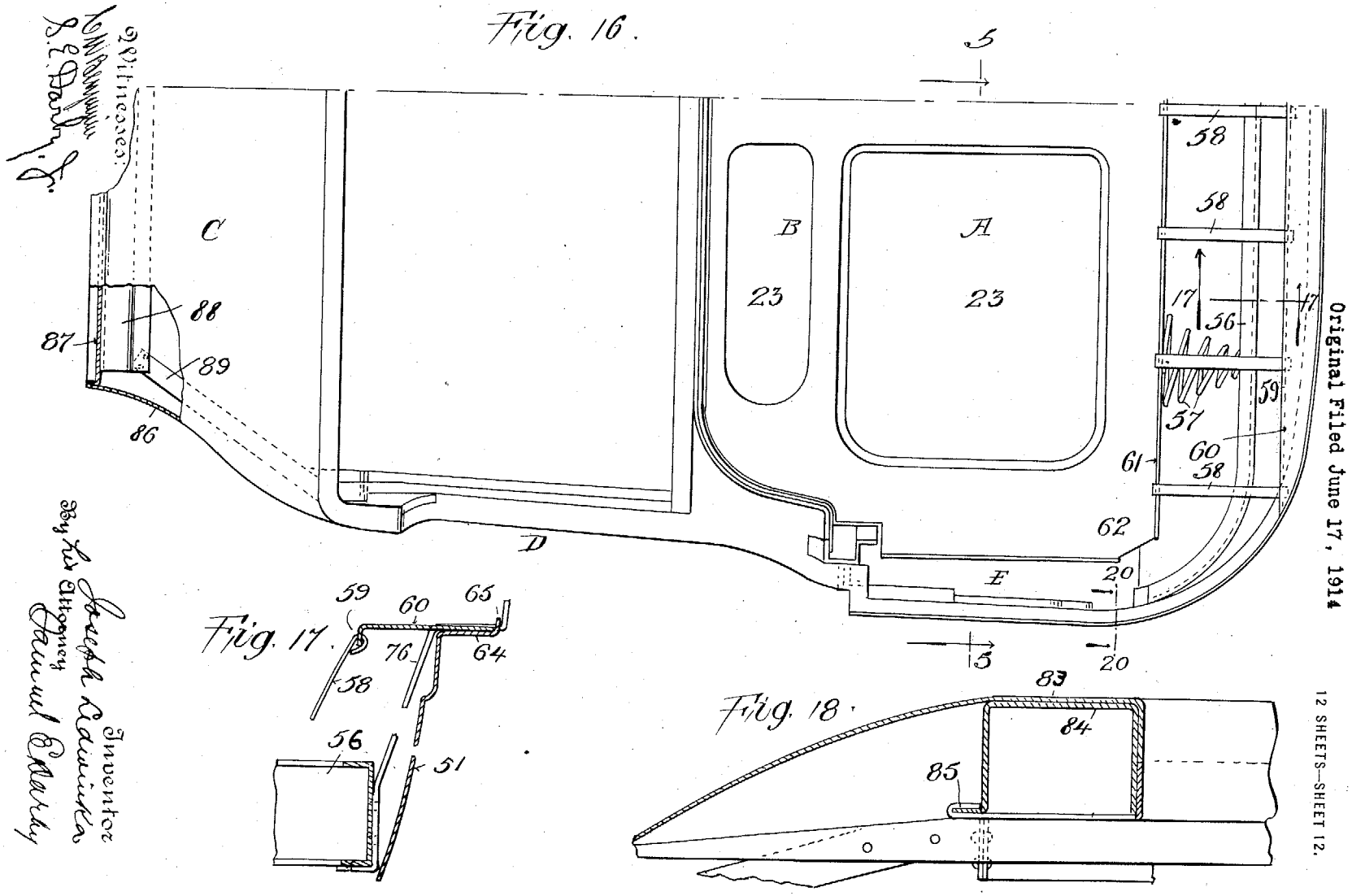
Witnesses:
W. A. Benjamin
S. E. Darby, Jr.
Inventor
Joseph Ledwinka
By his Attorney
Samuel E. Darby Reissued July 24, 1928.

Re. 17,051

UNITED STATES PATENT OFFICE.

JOSEPH LEDWINKA, OF PHILADELPHIA, PENNSYLVANIA, ASSIGNOR TO THE EDWARD G. BUDD MANUFACTURING COMPANY, OF PHILADELPHIA, PENNSYLVANIA, A CORPORATION OF PENNSYLVANIA.

AUTOMOBILE BODY.

Original No. 1,143,635, dated June 22, 1915, Serial No. 845,621, filed June 17, 1914. Application for reissue filed April 2, 1928. Serial No. 266,739.

This invention relates to automobile bodies.

The object of the invention is to provide an automobile body which is strong and durable, simple in construction, and economical to manufacture.

A further object is to provide an automobile body structure which permits of the duplication of parts without adjustments of or changes in jig templets measurements or fittings, and wherein the cost incident thereto and to the handling and assembling of parts is eliminated.

A further object of the invention is to produce an automobile body having its main part in the form of a skeleton frame which will take the strains imposed in the use of the machine.

A further object is to provide the main portion of the body in the form of a skeleton frame in which the elements are so formed as to insure assembling of the body economically and expeditiously in accurate and definite relative positions of the parts.

A further object of the invention is to provide a main skeleton frame composed of main side members each of which is formed in one integral piece with means thereon to secure the same together in definite relation to each other.

A further object is to provide a main skeleton frame composed of integral or one-piece side members connected and secured together and having a shell or sheathing applied thereover.

A further object is to provide a skeleton frame of the character referred to wherein the integral or one piece side members have formed integrally therewith upright portions to form door posts.

Other objects of the invention will appear more fully hereinafter.

The invention consists substantially in the construction, combination, location and relative arrangement of parts, all as will be more fully hereinafter set forth, as shown in the accompanying drawings, and finally pointed out in the appended claims.

In the accompanying drawings,—Figure 1 is a view in perspective of one form of skeleton frame made up of side pieces or members each formed in one integral piece with integral door posts and other portions and means for connecting the same to the other side member in definite relation.

Figure 1[a] is a top plan view of the same.

Figure 2 is a similar view of a form of shell or casing to be applied to the skeleton frame shown in Figure 1.

Figure 2[a] is a view in side elevation of the shell or casing.

Figure 2[b] is a top plan view of the same.

Figure 3 is a view in side elevation, parts in vertical longitudinal section through the front seat portion showing the front portion of the skeleton frame and shell applied thereto.

Figure 4 is a broken detail view somewhat enlarged, in section on the line 4, 4, Figure 3 looking in the direction of the arrows.

Figure 8 is a broken view in section on the line 8, 8, Figure 3 looking in the direction of the arrows.

Figure 14 is a broken view in perspective, partly in longitudinal vertical section through the rear seat portion of the body.

Figure 15 is a view similar to Figure 14, through the front seat portion of the body.

Figure 16 is a view in top plan of the front portion of the body showing the front seat and cowl, parts broken off and parts broken out and in section.

Figure 17 is a broken detail view in section on the line 17, 17, Figure 16 looking in the direction of the arrows.

Figure 18 is a broken detail view in section on the line 18, 18, Figure 3, looking in the direction of the arrows.

The same part is designated by the same reference numeral whenever it occurs throughout the several views.

Figure 1:
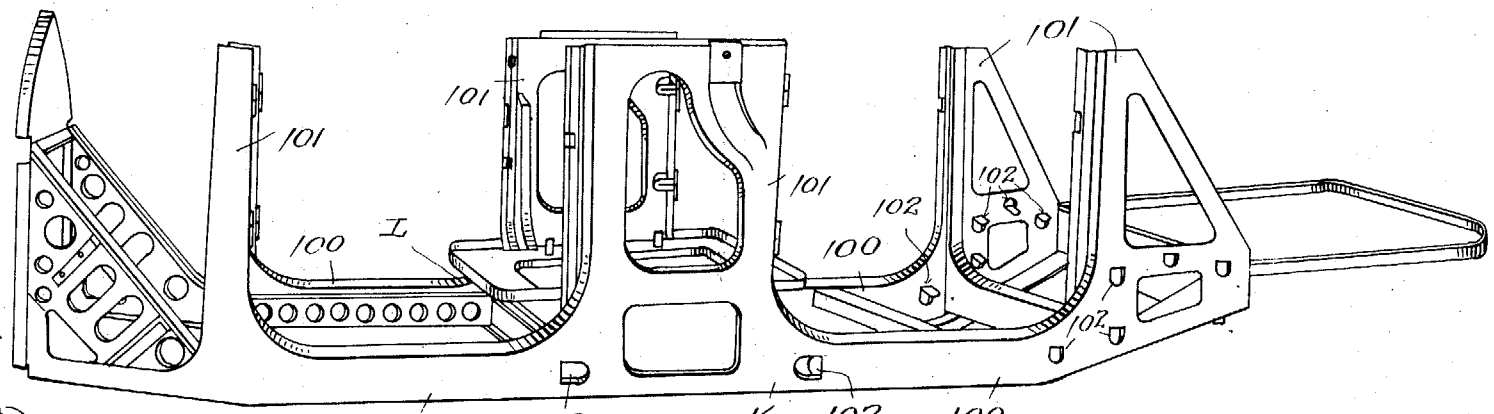
Figure 10:
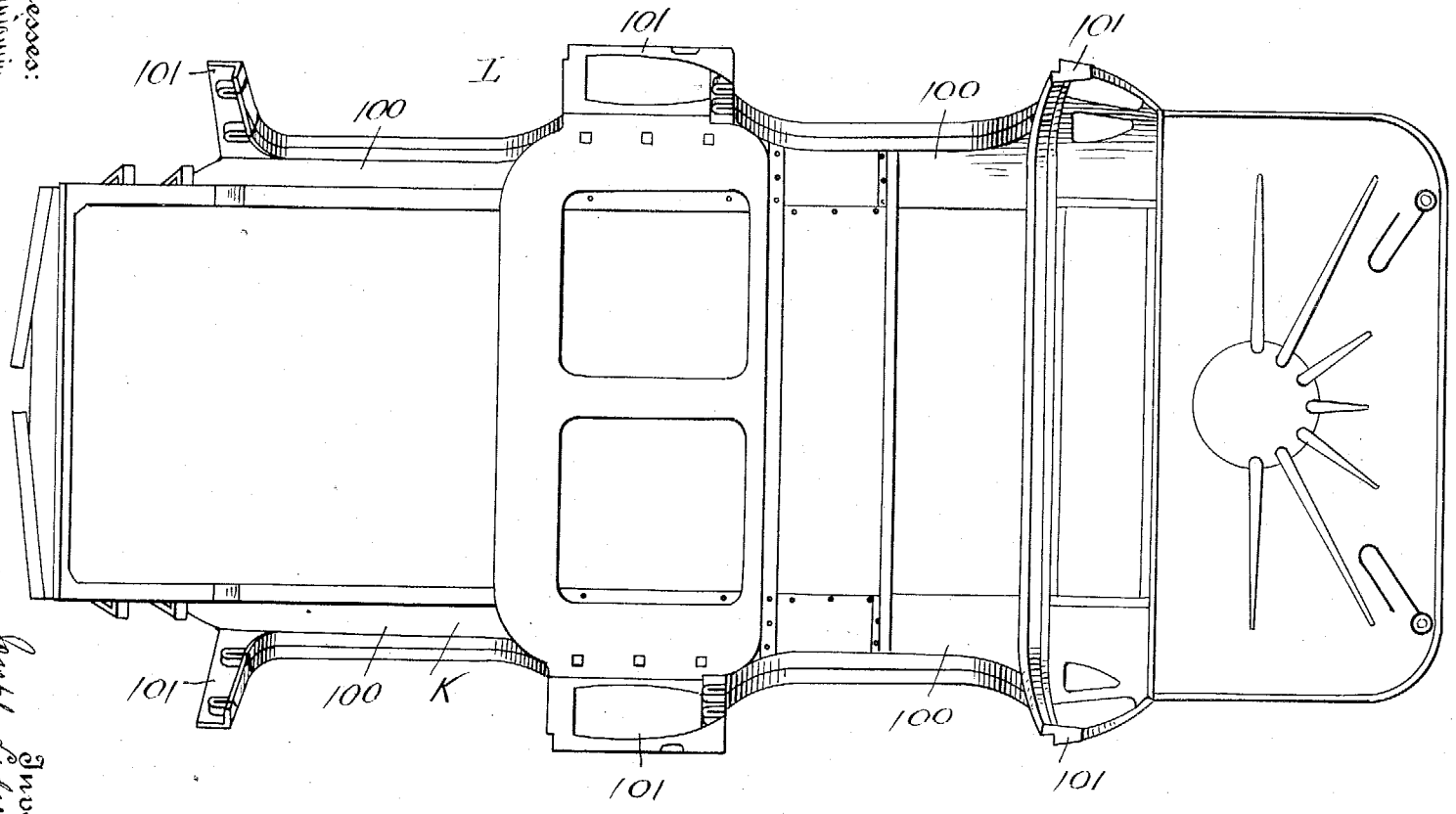
Figure 10 is a similar view on the line 10, 10, Figure 7, looking in the direction of the arrows.

The reduction of the weight of automobile bodies, and the cost of manufacture thereof, are among the serious problems with which manufacturers in this line are constantly confronted. Unnecessary weight of the body not only adds to the initial cost of manufacture but also to the cost of upkeep of the machine by reason of the wear imposed thereby upon the tires and the racking to which the body of the machine is subjected in use. It is an equally important and serious problem to secure strength and rigidity of the body frame in order to enable it to withstand the shock and vibrations incident to the rough usage to which such machines are subjected. Again, where the various parts which go into the structure of the body are secured together by means of rivets, bolts or the like, such securing means work loose, the parts, which, in many instances, are not of uniform rigidity with respect to each other, spring apart or separate from each other, thereby cracking or marring the exterior finish of the body at the joints, and rendering the same unsightly, as well as causing annoying creaking or other noise when the machine is running.

It has been a common practice heretofore in the manufacture of automobile bodies to make up separately the various parts which enter into the structure of the body and then to assemble and secure the parts together. It has been found necessary in practice in assembling the various parts required to produce the body, more or less to cut and fit each part as it is assembled into the structure, and to manually determine by individual measurement the proper or required location of the various parts, or the points for their attachment.

The result is that not only is the strength of the completed body structure materially lessened but the cost of manufacture of the bodies is greatly added to by the time and labor required to cut, fit, handle and assemble the various parts going into the structure and the necessary measuring of such parts to locate the proper points for their attachment in each body, and cutting them to such measurements, as well as the necessity for providing different sets of jigs and templets required for the various measurements.

It is among the special purposes of my present invention to avoid the various objections noted, and which are serious ones in this line of manufacture, and in carrying out my invention I propose to produce an automobile body made up of a skeleton frame having side portions suitably connected together and each of which, in its main portion, comprises an integral or one-piece stamping of sheet metal which may be produced at one or more stamping or die operations, and each formed with integral members, preferably but not necessarily of angular or channel formation in cross section to secure strength and rigidity and to form the main body braces, the door posts or other essential parts of the structure. I also propose to form integrally with each main side member of the skeleton frame suitable means such as lugs or the like at the required points for securing thereto the cross braces, or connections which secure the two side members of the frame together, or to form seat supports or for other purposes.

By thus stamping out each side member in one piece with the door posts, securing lugs, and the like, formed integrally therewith, I not only secure absolute uniformity in the relative positioning of the various cross members and in their points of attachment, thereby avoiding the necessity for separate measurements of individual parts to secure such locations, but I also am enabled to standardize the work, secure the maximum strength and rigidity, and vastly reduce the cost of manufacture. I am also enabled to materially reduce the weight of the body structure without sacrificing anything of strength and rigidity and this is a most important desideratum in the manufacture of automobile bodies.

Since the main side members are produced in one integral piece by die operations they may be turned out rapidly and most economically, and since on each side piece the point of attachment of each cross connection member and the location of each lug, door post, or other point, is definitely and uniformly fixed, the time and work required to assemble the frame is enormously reduced. I also propose, in accordance with my invention to provide a skin or shell, which, if desired, may be made up of integral stampings in uniform unit members shaped to the desired contour and applied to the skeleton frame, preferably by welding the same at suitable points thereto, though in this respect my invention in its broadest scope as defined in the claims, is not to be limited or restricted.

By welding the parts together I not only secure an integral completed structure but I avoid the danger and objection of unsightly appearance due to the breaking of the finish, enamel or painting of the body at the joints of the parts thereof.

In completing the body for use after the skin, shell or sheathing is applied to the skeleton frame the upholstery or interior finish is applied thereto, and the structure above described lends itself admirably to the application of the interior finishing to the shell in a most efficient, expeditious, and desirable manner as will be more fully pointed out hereinafter.

In an automobile body structure having the characteristics above indicated the skeleton frame is provided which is light though strong, rigid and durable, and well able to take the strains imposed upon the body in use, and upon which the seats, cowl, or other parts are mounted.

In the accompanying drawings I have shown a construction embodying my invention and the method I employ in carrying the same into practical operation, the construction shown, while the best form in which I contemplate at present carrying out my invention, is merely illustrative of the principles involved, as many variations in the details of structure and arrangement may occur to persons skilled in the art and still fall within the broad scope of my invention as defined in the claims.

Figure 2:
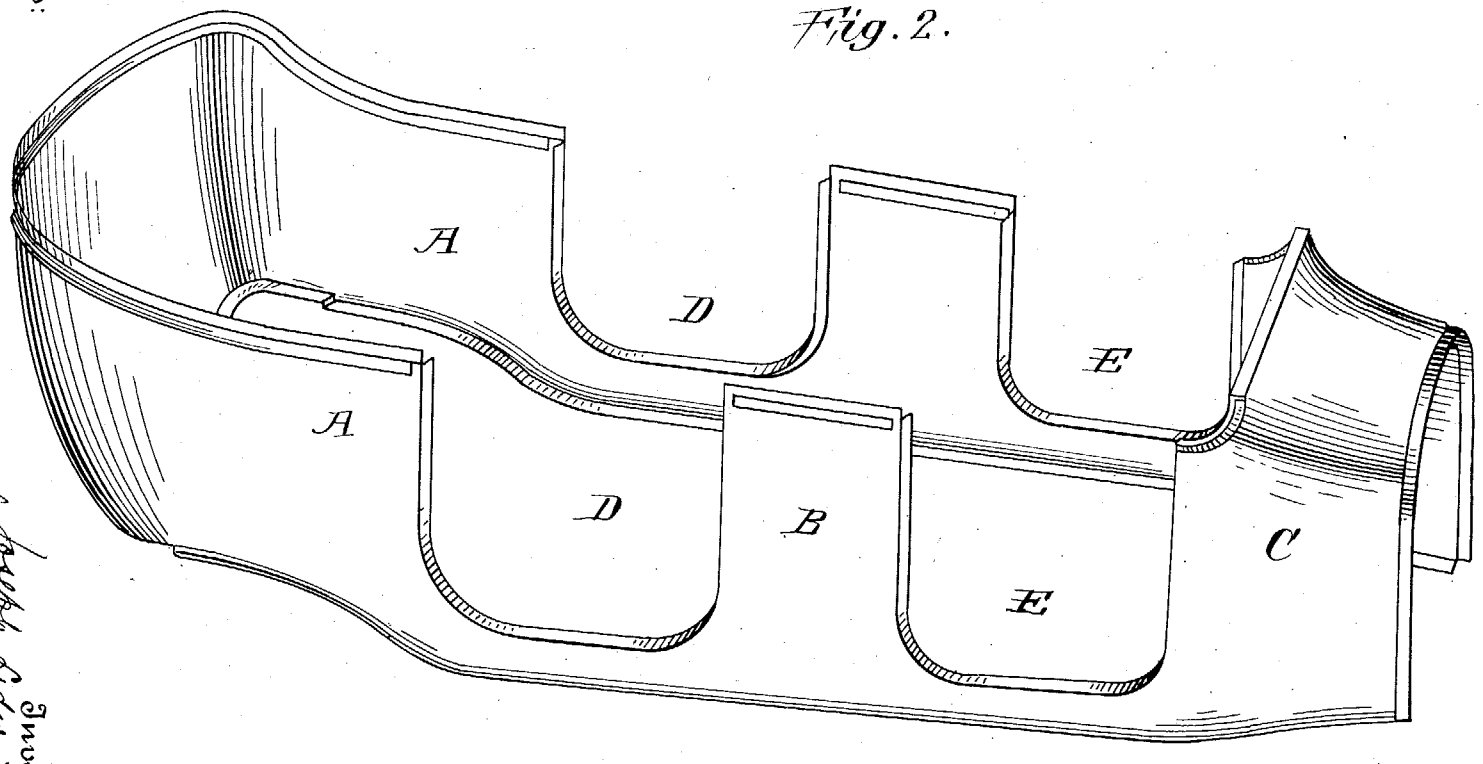
Figure 2A:
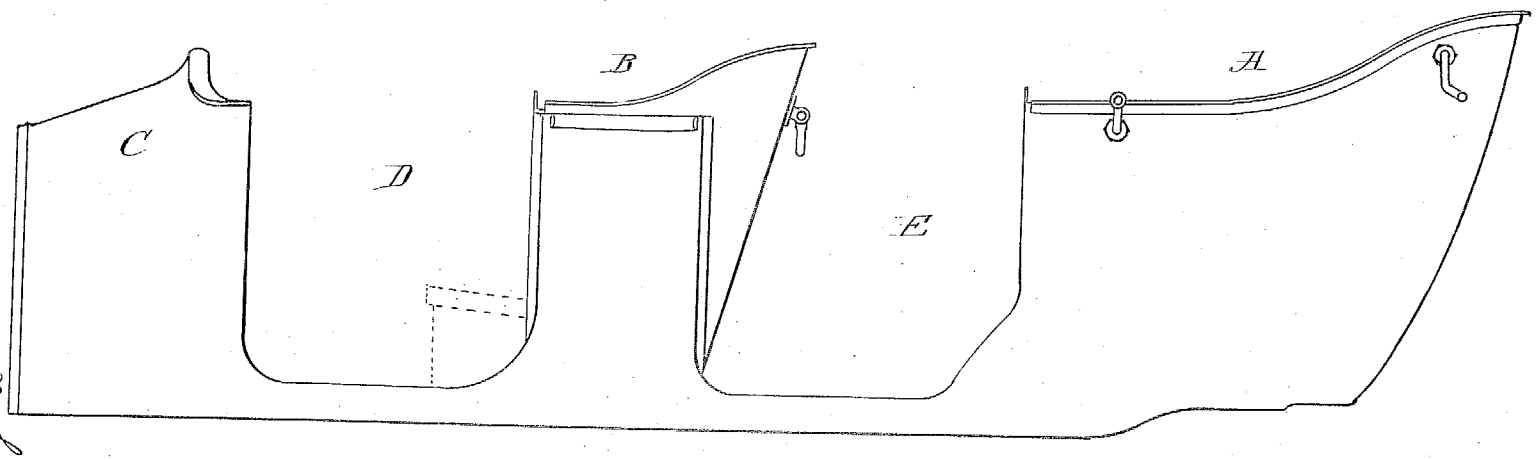

Referring to the drawings, I have shown in Figure 1 in perspective and in Figure 1[a] in top plan one form of skeleton frame, and in Figures 2, 2[a], and 2[b] diagrammatic outlines in perspective top plan and side elevation, respectively, of an integral sheet metal shell for an automobile body constructed in accordance with my invention, the shell including the rear seat portion A, the front seat portion B and the cowl portion C, and having side openings D, E, for the front and rear doors. When the body is completed with the parts thereof assembled and secured together into an integral structure, a light, strong, durable and economical body is produced which possesses the advantages and avoids the objections above noted.

Referring to Figures 1 and 1[a], it will be seen that the skeleton frame consists, in its essential features of the main side members K, L each made in one integral piece and in the form of a stamping from sheet metal. This particular outline, shape, contour and characteristics of the side members of the skeleton frame will, of course, depend largely upon the particular style, design and characteristics of the body to be produced. That is to say, if a one seat body is to be produced then the side members of the skeleton frame will possess the characteristic features in respect to the door posts, seat supports, and the like of a one seat body; if a two seat body is to be produced, then the side members will be correspondingly constructed with reference to the door posts, seat supports and the like. In any case each side member of the skeleton frame in the main portion thereof is formed in one single stamping with the longitudinal horizontal and vertical parts to form, respectively, the side beams and door posts, cowl and seat supports, and the like.

To illustrate the principles of my invention I have shown a skeleton frame for a two-seat body with two door-ways on each side. In this case the horizontal longitudinally extending portions 100, constitute the side sills or girders of the frame, and as will be more particularly hereinafter described, these sill or girder portions may be made of angular or channel shape in cross section to secure strength and rigidity. The vertical portions 101 formed in one piece with the longitudinal portions 100, constitute posts for the bounding edges of the door openings, supports for the dash or cowl, seat supports for the outer shell or sheathing. At suitable definitely fixed and predetermined points therein, the side members K, L, or the horizontal and vertical portions thereof are formed with means such, for instance, as lugs 102 punched out therefor for attaching thereto the cross connections, which serve to connect the two side members of the body together or to form seat or other supports, thus definitely and uniformly fixing and relatively positioning these cross connections and supports.

It is obvious that the cross connections may be braces, angular or channel shaped in cross section or otherwise, or the seat supporting frames themselves or parts thereof may constitute such connections and perform the double function of seat supports and cross connections between the side members of the frame. If desired, the seat, dash and cowl supports and the like of the side members of the frame may be in the form of extensions thereof or additions secured thereto integrally by welding or otherwise. The shell 20 will, in like manner, vary in shape and contour according to the particular type or design of car. In the particular design shown the shell comprises the three principal portions A, B and C. These may all be in one piece or formed separately and suitably secured together in one integral piece by welding or otherwise.

Referring to Figs. 7, 9, 10, 12, 13 and 14, showing details of parts and arrangements entering into the structure of the rear seat portion of the body, reference numeral 20, designates the outer body sheet or shell which is pressed by dies into shape to form the side and curved rear wall of the rear seat. This shell is applied to the skeleton frame, indicated in these figures of the drawing by numeral 21. A channel member 22 may be provided to connect to the upper ends of the vertical posts or portions of the skeleton frame side members on opposite sides of the body. The channel member 22, is longitudinally shaped to the interior curvature of the rear seat portion A of the body shell. If desired the vertical or other portions of the skeleton frame, as well as other suitable portions of the structure, may be cut out, as indicated at 23, to reduce the weight of the structure. The frame skeleton 21 is secured to the inner surface of the outer shell in any desired manner, preferably by spot welding the same thereto at suitable points.

Figure 13:
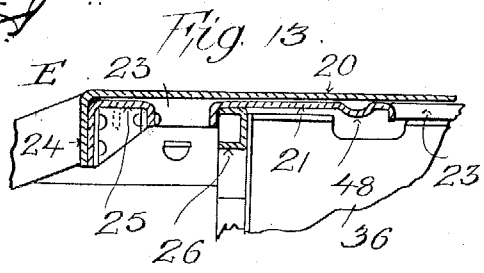
Figure 13 is a broken view in section on the line 13, 13, Figure 7, looking in the direction of the arrows.

The shell 20 is provided with an inwardly projecting flange 24 at its vertical edge adjacent the side door opening E, see Fig. 13, in order to secure additional strength at that point, said flange fits over the vertical channel member 25 of the skeleton frame and is secured thereto by spot welding or otherwise. This channel member 25 constitutes one of the vertical door posts of the skeleton frame, and is formed of channel shape to secure strength. In order to still further strengthen and render more rigid the body sides adjacent the door opening E, and also to afford means for attaching the interior finish or upholstery, an auxiliary member 26 is applied to the vertical side portions of the skeleton frame 21. The member 26 is of suitable shape to receive a wooden strip to which the upholstery is secured. For this purpose said member is shown as of channel shape in cross section. A transversely extending brace or strut 27 connects te skeleton frame side members. This connecting member is shown as channel shaped and is located below the door openings, see Figs. 7 and 12, said strut or brace being suitably connected to the side skeleton side members by welding or otherwise. At their lower edges the shell and the horizontal longitudinal portions of the skeleton frame side members are formed with inwardly extending flanges 28, 29, see Figs. 7 and 14, which fit the one over the other and are secured together by welding or otherwise. Lugs 30 are cut and pressed out of the skeleton side members 21, at various and suitable points, to form means for attaching cross braces, seat and foot plates, or other connecting parts and to accurately locate and fix the positions thereof. A channel member 31, see Fig. 7, similar to the channel member 22 of the skeleton frame, and forming a part thereof, connects the lower portions of the vertical members of the skeleton frame 21, on opposite sides of the body, and is bent or curved to conform to the contour of the rear seat portion of the outer shell 20.

It will be noted that the side members of the skeleton frame are formed at the thresholds of inwardly presenting channel form and that they are vertically and rearwardly flared, see Fig. 15, for some distance just forwardly of the vertically extending channel post 25 and the upper edge of said flared portion merges by its channel section into the post 25. This construction provides a wide foundation for the door post and combines strength with simplicity of construction in a region where prior constructions have been characterized by complexity and cumbersomeness, namely in the region of the usual "kick up", i. e., where the lower lines of the body are upwardly offset to provide clearance for the rear axle. This simplicity of construction is made possible largely by the use of sheet metal stampings, flanged to provide strength and an open construction facilitating joinder of parts by spot welding.

Figure 19:
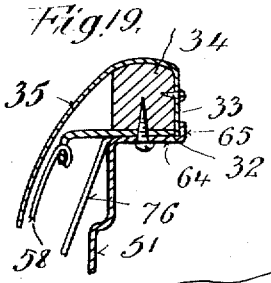
Figure 19 is a broken detail view on the line 19, 19, Figure 7, looking in the direction of the arrows.
Figure 11:
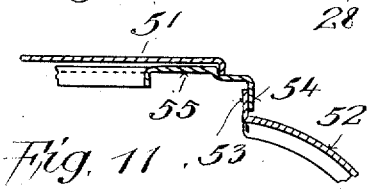
Figure 11 is a broken detail view in section on the line 11, 11, Figure 3, looking in the direction of the arrows.
Figure 10:
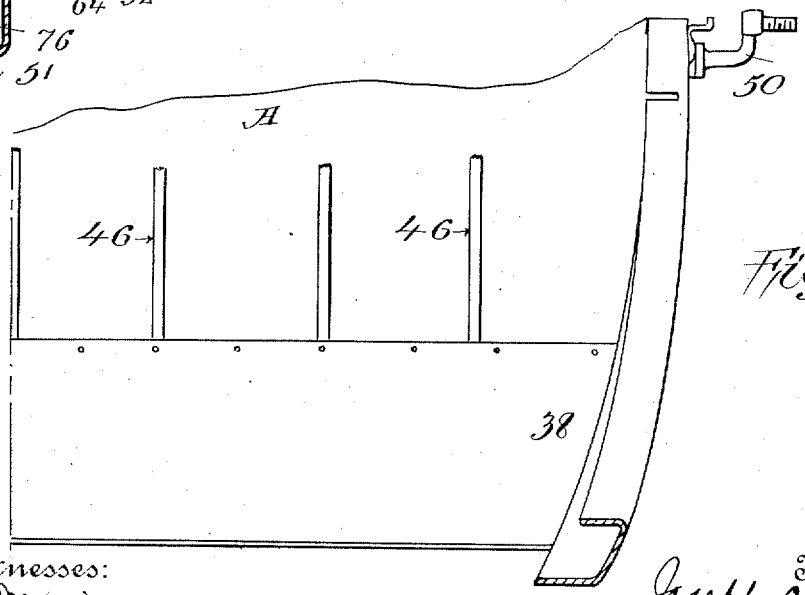
Figure 12:
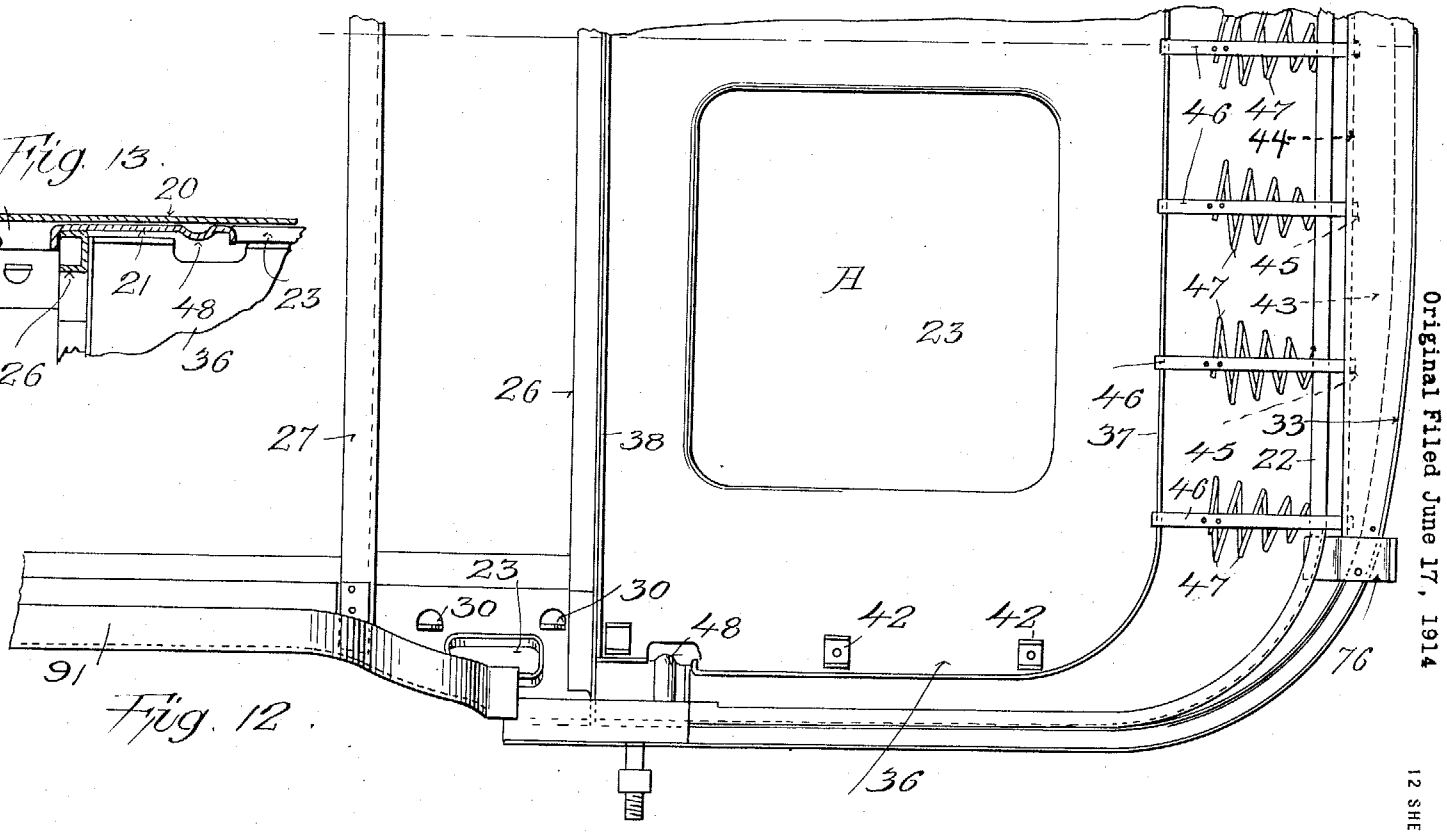
Figure 12 is a broken view in top plan of the rear seat portion of the body.

The upper edge of the shell 20 is provided with an outwardly extending portion 32, terminating in an upturned flange 33, see Fig. 19, thereby forming a seat to receive a strip 34, to afford means for attaching the upholstery or leather finish lining 35 for the body. The upper edge of the lining is secured underneath the strip 34 and is then passed around the outer side of said strip up and over the same, and thence down the inside, thereby concealing said strip, giving a neat appearance, as well as affording a secure fastening for the lining.

The rear seat frame or pan is made up of a sheet 36 having its edges turned up to form a lateral flange 37. The front flange 37 of the sheet 36 is secured by welding or otherwise to a plate 38, see Figs. 7 and 14, while the side edge flanges of said sheet are secured, preferably by welding to the shell 20.

Figure 9:
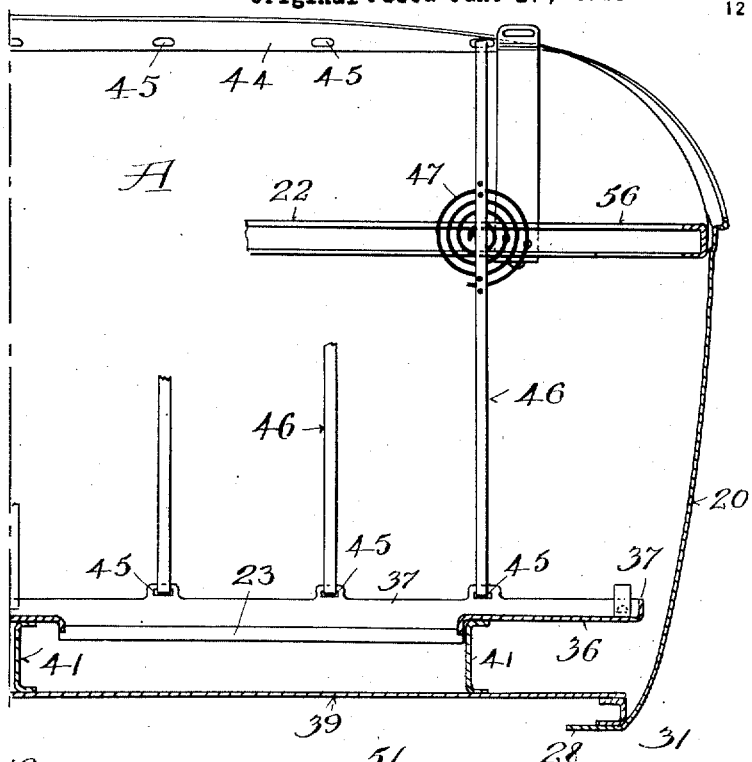
Figure 9 is a broken view in section on the line 9, 9, Figure 7 looking in the direction of the arrows.

To secure lightness the center of the seat sheet 36 is cut out, as indicated at 23, the bounding edges of the cut out portion being flanged for strengthening and for rigidity. A flanged bottom sheet 39 is welded at its edges to the upper flange of channel member 31, and the flange 40 at the front edge thereof is similarly secured to the spreader plate 38, which extends transversely across the body and constitutes a riser for the seat frame as well as a transverse brace for connecting opposite sides of the body frame. By this construction the plate 38 serves not only for a seat support but it also constitutes a cross brace for connecting together the side members of the skeleton frame. I am thus enabled to secure greatly increased strength and rigidity due to the use of a wide connecting plate at this point. If desired, and in order to still further support the seat plate 36, channel strips 41 may be interposed between the seat plates or pans 36, 39, with their respective flanges welded to said plates or pans, as shown in Fig. 9. The seat cushions, not shown, rest upon the seat plate 36, and may be retained in place in any suitable or convenient manner, as, for instance, by means of brackets 42. To reduce the weight the webs of channel members 41, interposed between the seat plates or pans 36, 39, may be cut out as indicated at 23 in Fig. 7.

Figure 7B:
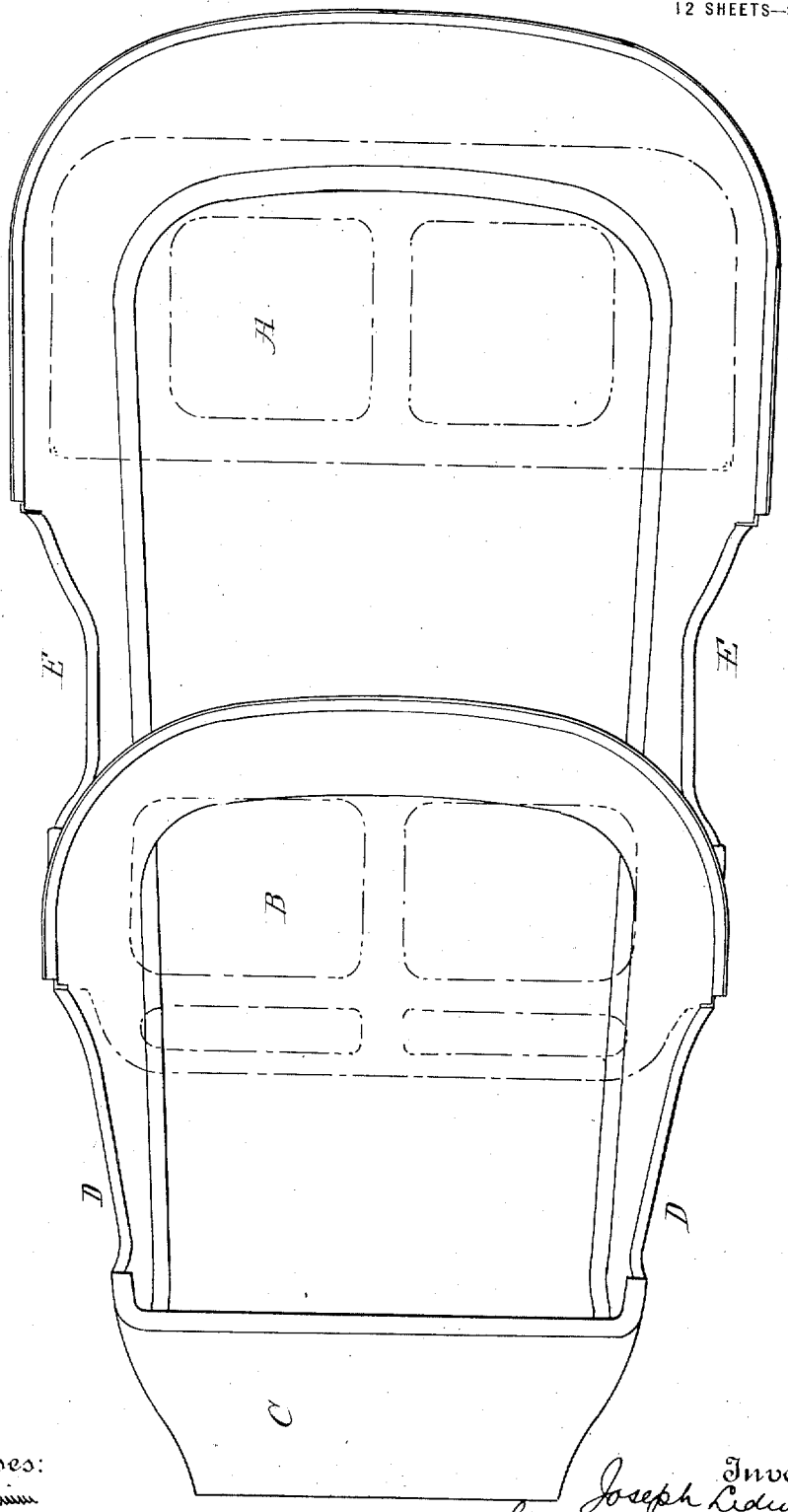
Figure 7 is a broken view in vertical longitudinal section through the rear seat portion of the body.
Figure 5:
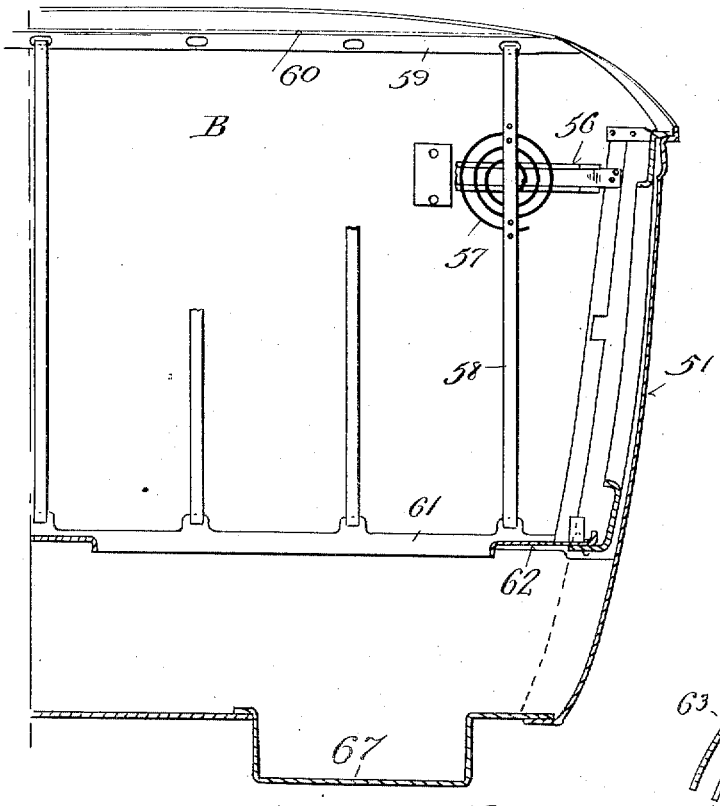
Figure 5 is a broken view section on the line 5, 5 Figures 3 and 16 looking in the direction of the arrows.
Figure 6:
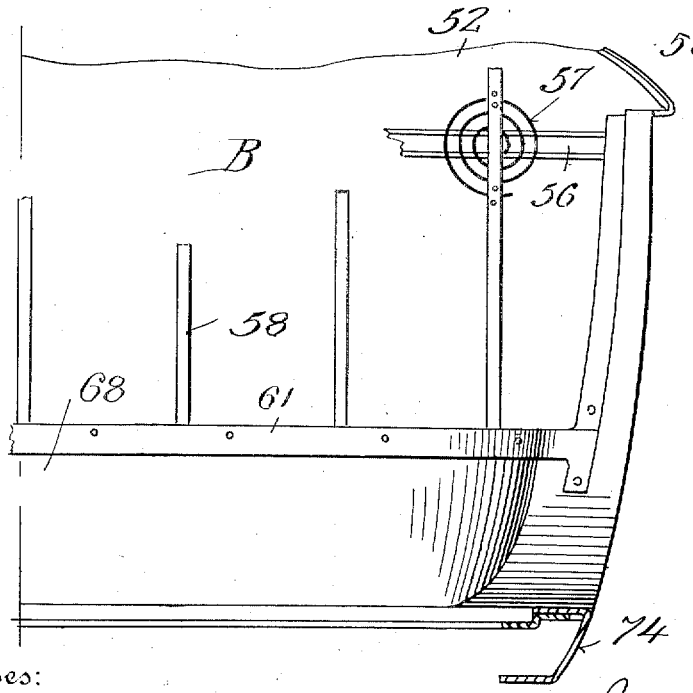
Figure 6 is a similar view on the line 6, 6, Figure 3 looking in the direction of the arrows.

The plate 38, it will be noted by reference to Fig. 7, is flanged forwardly at its lower edge in the plane of the lower foot plate or floor board supporting lugs 30 and constitutes with them and with the cross members 27 and the downwardly offset inner portion of the upper flange of the threshold portion of the side frame members, see Fig. 6, means for supporting the flooring in the rear seat portion of the body. Here again the construction in sheet metal stampings makes for simplicity and neatness of construction, while making for efficiency and providing great strength and durability.

The rear seat back may have any desired construction to secure a cushion action. The structure I have shown affords a most simple and efficient arrangement for the purpose. In the structure shown a flanged member 43 is applied to the upper edge of the shell 20, at the rear thereof, the flange 44 of said member extending downwardly inside the body as clearly shown in Fig. 7. This member 43 is welded to the portion 32 of the upper edge of the shell 20. Eyelets 45, formed in the depending flange 44 of member 43, and in the upturned flange 37 of the seat plate 36, afford means for securing the respective ends of straps 46. These straps are arranged to bear against or to be engaged by coil springs 47, which are seated against the channel member 22 of the inner skeleton frame 21. The upholstery or leather finish is applied over this cushion back frame structure, and is secured at its upper edge, in the manner above described, to the upper flanged edge of the shell 21. If desired, the vertical or other portions of the skeleton frame 21 may be still further strengthened and rendered more rigid by pressing a channel bead 48 therein, as shown in Figs. 7 and 14.

In order to provide supports for the automobile top, blocks 49 are welded to the body sheets, shell 20, or the skeleton frame, to which blocks the top irons 50 are secured. The top or other irons may be thus secured to the body at any suitable or desired point.

The stamped or pressed out lugs 30, serve not only as supports for various cross connecting members of the body structure and for retainer strips for the upholstery, as above explained, but they also serve to locate said members in standard and positively fixed and predetermined positions, thereby rendering the work of assembling the frame structure members, the cross braces, floor or seat members, upholstery retainers and the like, a simple and very expeditious matter.

Figure 20:
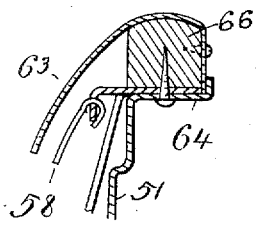
Figure 20 is a view similar to Figure 19, on the line 20, 20, Figure 16, looking in the direction of the arrows.

The structure of the front seat portion B is shown more clearly in detail Figs. 3, 4, 5, 6, 8, 11, 15, 16, 17 and 18. The general plan of construction of the rear seat structure above described, applies also to the front seat structure. The main portion of the shell 51 at this point, like sheet 20 of the rear seat portion A, is pressed out in a die press into the desired shape and contour to form the walls of the front seat. The rear wall 52, thereof, if desired, may be made in a separate piece, flanged at its edges, as shown at 53, Fig. 11, and the said flange secured preferably by welding, to a cooperating flange 54, formed at the edge of a vertical post or portion of the skeleton frame, as indicated at 55. The vertical portions of the skeleton frame side members adjacent the front seat portion of the body are connected together at their tops by means of a member 56, shown as channel shaped and similar in arrangement, relation, purpose and function to the channel member 22, above described. This channel member 56 forms a seat for the back cushion springs 57, which springs are held to their seats by means of straps 58, which are attached at their upper ends to eyelets formed in a depending flange 59 of a member 60, extending across the body along the upper flanged edge of shell 52, to which it is welded. The lower ends of straps 58 are attached to eyelets formed in the upturned flange 61 of a front seat plate 62. The upholstery or leather finish 63 for the cushion back just described is applied over straps 58 in the same manner as above described with reference to the rear seat structure, and as shown in Fig. 20, the portions 64 and 65 at the upper edge of the shell are shaped to form a seat for a retainer strip 66 to which the upper edge of the lining or finish material 63 is secured as above described.

The seat plate 62 is formed with the flanged openings 23 to reduce weight and the flanges 61, 67, afford means for welding the same to the supporting plates 68 and member 69, the opposite ends of members 69 bridging the mouths of the channel-shaped side members 74 extending across the thresholds. The latter is in the form of a box as most clearly shown in Fig. 3, its upper rear edge being horizontally flanged as shown at 70, to form a support for the seat plate 62. By this special construction the box formed by the member 69 may serve as a receptacle for the batteries, a tool box or other purposes. The member 68 affords a most efficient connecting member for the sides of the skeleton frame, as well as a support for the front seat pan or frame. It is to be understood of course that the box may be located at any convenient place or may be omitted entirely. The lower edge of the portion 52 of the shell is welded to the channel member 69. An angle shaped cross plate 71 is welded at one flanged edge to the channel member 69, as indicated at 72 and at its other flanged edge, as at 73, Fig. 3, to the flange of the longitudinally extending portions of the skeleton side members 74. The plate 68, as above explained, which forms a riser and support for the front edge of the seat plate 62, and also a side connecting member for the skeleton frame, is of angular form, having a wide vertical web and a forwardly extending flange at the bottom of the web, and extends transversely across the body, thereby forming a support for a floor plate as well as a support for the front edge of the seat plate 62. The lower flange forms the support of the rear edge of the floor plate or flooring, not shown, and lies, like the corresponding flange on the rear seat plate 38, in the same plane with the inner downwardly offset portions of the side frame members 74, Figures 3 and 6, which cooperate with it in supporting the floor plate or floorboard by providing seats for the side edges thereof. The seat cushions (not shown) are received on the seat plate 62, and are retained thereon by the brackets 75.

The channel members 56 and 22 of the front and rear seat portions A, B, may be connected to the upper edges of the shell portions 51 and 20, respectively, by means of straps or hangers 76.

Adjacent the rear edge of the front side door opening D, the shell 51 is formed into a lateral inwardly extending flange 77, see Fig. 8, which fits over a similar flange 78, formed at the corresponding edge of a vertically extending portion of the skeleton frame side 55. A channel member 79 presenting longitudinally and forming an element of the post structure is located within the angle of the flanges 77, 78, to give strength and rigidity at this point. The portion 55 of the skeleton frame is continued from the portion 78 thereof in an angular portion 80, within the angle of which is seated a post 81 to form an efficient means of attachment for the upholstery.

At the opposite edge of the front side door opening the portion 83 of the shell is bent or pressed into box shape around or over a flanged inwardly presenting channel member 84 of the skeleton frame so as to close the mouth of the channel, the edge of the body sheet 83 being bent over the edge of the flange of the channel member, as indicated at 85, thereby providing a post structure having its forward portion of an inwardly and forwardly presenting angular section. This construction affords a strong light durable door jamb and presents no exterior joints to become loosened by rough usage or slamming of the door.

The cowl C is formed of metal sheets 86 which are pressed to the desired shape and contour, and form part of or are welded to the shell. The front plate 87 of the cowl is flanged at its edges and these flanges are welded to the front edges of the cowl body sheet 86. A cowl brace member 88, 89 forming part of or welded to the skeleton frame is welded to the front plate 87.

This cowl brace member comprises a transversely extending angular portion 88 secured to the front plate 87, and two side portions 89 of substantially triangular shape, in side elevation, see Fig. 3, and forming flaring extensions of the threshold frame members, and being like the thresholds, flanged at top and bottom, the top flange being in continuation of the downwardly offset portion of the threshold frame members, and serving as side supports for the forwardly inclined flooring or toe boards (not shown), the forward edge of which seats within a rearwardly presenting angle of the transverse portion 88.

The longitudinally extending side members 91 of the rear seat portion of the body shell are formed of channel shaped extensions of the body shell. Similarly the members 74 of the front seat portion of the body are formed of channel shaped extensions of the body shell 51. These side members 91 and 74, are fitted and welded together, and to the corresponding portions of the skeleton fame.

Fom the foregoing description it will be seen that I provide an automobile body which, when assembled and completed, is in one integral structure without joints to wear or work loose. It is made of parts which are of standard form and therefore can be easily, readily and expeditiously made in quantities, and expeditiously assembled, all parts being of standard dimensions fitting together without requiring measurements to locate, or cutting to fit them. Joints which are liable to wear or work loose and to rattle or mar the paint or finish of the body are entirely eliminated. The use of metal parts throughout, and particularly sheet metal stampings of angle and channel construction and curvilinear form which are welded together, insures strength and durability.

By the construction described the weight of the body as compared with bodies heretofore manufactured is enormously reduced thereby reducing not only the initial cost of manufacture but also the cost of maintenance and upkeep of the machine, and the cost incident to the handling and assembling of the parts as heretofore experienced is very greatly reduced.

Having now set forth the objects and nature of my invention and a construction embodying the principles thereof, what I claim as new and useful and of my own invention and desire to secure by Letters Patent is,—

1. An automobile body frame including side members each formed in one piece and having vertical portions thereof to form door posts, a skeleton frame member connecting the upper parts of corresponding door posts at opposite sides of the body frame, and a shell applied to said frame to form body sides and a seat back, the seat being connected to the skeleton frame member.

2. An automobile body frame including side members each formed in one piece and having door posts formed integrally therewith, a skeleton frame member connecting the upper parts of corresponding door posts at opposite sides of the body frame, a shell applied to said body frame and forming the body sides and the seat back, and connections from the upper edge of said shell to said skeleton frame member.

3. In an automobile body structure, a body shell shaped to form the body sides and a seat back, and a skeleton frame to which said shell is secured, said skeleton frame having vertical side portions and an integral channel portion connecting the upper ends of the side portions, said channel member being shaped to conform to the contour of the back and secured to said back.

4. In an automobile body structure, an outer shell and a supporting skeleton frame therefor, each having integral vertical side portions, the proximate edges of the vertical side portions of said shell and frame being secured together, and an auxiliary channel member secured to the vertical side portions of the skeleton frame adjacent said edges.

5. In an automobile body structure, an outer shell and a supporting skeleton frame therefor each having integral vertical side portions, the outer shell having also an integral back and the skeleton frame having a channel member connecting its vertical side portions, the proximate edges of said portions being flanged and secured together, and an auxiliary channel member located adjacent the edges of said side members and secured to the skeleton frame, said last mentioned channel member extending across the body from side to side thereof.

6. In an automobile body structure, an outer shell having integral vertical side portions and a back portion, a supporting skeleton frame therefor having integral vertical sides and connecting channel members, the proximate edges of said vertical side members being flanged and the flanges secured together, and a side spacing member extending transversely of the body and secured to the vertical side portions of the skeleton frame.

7. In an automobile body structure, an outer shell having integral vertical side portions and a back portion, said vertical side portions having door openings therein, a supporting skeleton frame including cooperating vertical side portions and cross members connecting the same, means for securing together the edges of said side portions at the door openings, a vertical brace member secured to the side portions of the skeleton frame adjacent said door opening and a horizontal cross brace connecting said side portions below the door openings.

8. In an automobile body, a skeleton supporting frame having integral longitudinal side portions and vertically extending portions, and a shell applied to the exterior surface of the skeleton frame, said shell having a curved rear portion connecting the vertical portions of the skeleton frame on opposite sides of the body to form a seat back, said rear portion having longitudinally extending integral side portions respectively secured to the vertical portions of the skeleton frame.

9. In an automobile body structure, an outer body shell having integral side and back portions, a supporting skeleton frame therefor having integral vertical side portions secured to the side portions of the outer shell, a member connecting together the vertical side members of said frame, and curved to conform to the shape of said back portion, and means for securing said connecting member to said back portion.

10. In an automobile body structure, an outer shell having integral side and back portions, a supporting skeleton frame having integral vertical side portions, the side portions of said shell being applied to the exterior surface of the skeleton frame side portions, a connecting member intermediate the shell side portions and straps for securing said connecting member to said back portion.

11. In an automobile body structure, a body shell having side and back portions, said shell having a flange at its lower edge, a channel member welded to said flange, a plate supported upon said channel member, a vertical cross member to which said plate is connected, and a seat supported on said plate and cross member.

12. In an automobile body structure, an outer body shell having side and back portions and a doorway opening in the side portions, a supporting skeleton frame therefor, said frame having integral vertical side portions, the edge of the outer shell at the doorway opening having an inwardly extending flange, the adjacent edge of the skeleton frame having a cooperating flange and an extended angle portion, and a post seated in said angle portion.

13. In an automobile body structure, an outer shell having side and back portions, and a door opening, the edge of said shell adjacent said opening having an inwardly extending flange, a skeleton supporting frame having integral side portions terminating at their edges in cooperating flanges, and an extended angular portion, forming a seat, a post fitted to said seat, and a channel member secured to said cooperating flanges.

14. In an automobile body structure, a body shell having a door opening, the edge of said shell adjacent said opening being bent into a box channel, and a channel member inclosed in said box channel, and having a flanged edge engaged by the edge of said body shell.

15. An automobile body comprising a skeleton frame having side members, each made in one piece and having vertically extending integral portions to form door posts and also having supporting and positioning lugs, cross members connecting said side members and secured to said lugs, and a shell or sheathing applied to said skeleton frame.

16. An automobile body frame including sheet metal side members each formed in one piece and having secured integrally thereto means to provide positioning supports at predetermined points, and cross members connecting said sheet metal side members, said cross connecting members being secured to said positioning supports.

17. In an automobile body structure, an outer shell having integral side portions and a seat back portion, in combination with a supporting skeleton frame having integral side portions secured to the side portions of said outer shell, said frame having positioning and supporting lugs and a seat support secured to said lugs.

18. In an automobile body structure, a sheet metal body shell having integral side portions and a seat back portion the upper edge of said shell having an outwardly extending portion terminating in an upturned flange forming a seat to receive a lining strap.

19. In an automobile body structure, a sheet metal body shell having an outwardly extending portion at its upper edge terminating in an upturned flange to form a seat, a retainer strip located in said seat, and a lining having its upper edge received between said seat and retainer strip, said lining being passed over the outer and upper surfaces of said strip.

20. In an automobile body structure, a body shell having side portions and a curved seat back portion, a brace member, means for connecting the ends of said brace member to said side portions, said brace member, intermediate its ends being curved to the contour of said seat back portion, and means to connect said brace member to said back portion.

21. In an automobile body structure, a body shell having side portions and a seat back portion, vertically extending members secured to the side portions of said shell, a cross connecting member secured to said vertically extending members at opposite sides of the shell and a seat plate supported upon said cross connecting member.

22. An automobile body frame composed of sheet metal side portions having positioning lugs, and members connecting said side portions and supported upon said lugs.

23. In an automobile body structure, an outer sheet metal shell having integral side and back portions, and a supporting sheet metal skeleton frame therefor, having side portions connected together, said frame having longitudinally extending portions of substantially channel shape in cross section, the vertical edges of said shell and frame being flanged and secured together, and the lower edges of said shell being flanged under and secured to the underneath wall of said channel.

24. In an automobile body structure, an outer sheet metal shell having integral side and back portions, and a supporting sheet metal skeleton frame therefor, having side portions connected together, said structure having threshold portions including a substantially vertical web portion flanged at top and bottom, one of the flanges being provided with a vertically offset portion forming a seat for a floor board, the vertical and lower edges of said shell and frame being flanged and secured together.

25. In an automobile body structure, an outer sheet metal shell having integral side and back portions, and a supporting sheet metal frame therefor, having side portions connected together, said frame including longitudinally extending sills having threshold portions of substantially inwardly presenting channel form, one of the side walls of said threshold portions being provided with a vertically offset extension forming a seat for a floor board, the vertical and lower edges of said shell and frame being flanged and secured together.

26. In an automobile body structure, an outer sheet metal shell having side and back portions, and a supporting sheet metal skeleton frame therefor, having side portions connected together, said frame having inwardly presenting channel form threshold portions, one of the side walls of which is provided with an offset extension to provide a floor board support, and a connecting member between said side portions of the frame having a floor supporting flange in the plane of the offset extension of the threshold portion of the frame, the vertical and lower edges of said shell and frame being flanged and secured together.

27. In an automobile body structure, an outer sheet metal shell having integral side and back portions, and a supporting sheet metal skeleton frame therefor, having side portions connected together, said structure comprising sill structures of substantially channel shape in cross section at the thresholds and of substantially the height of the thresholds, the vertical and lower edges of said shell and frame being flanged and secured together.

28. In an automobile body structure, an outer sheet metal shell having integral side and back portions, and a supporting sheet metal skeleton frame therefor, having side portions connected together, and including sill structures of substantially angle shape in cross section at the thresholds and forming the outer and top walls of the threshold, the vertical and lower edges of said shell and frame being flanged and secured together.

29. In an automobile body structure, an outer sheet metal shell having integral side and back portions and door openings in the side portions, a supporting sheet metal skeleton frame having integral vertical side portions secured to the side portions of the outer shell adjacent the door openings, said side portions including threshold structures of substantially channel section, and a cross brace connecting the side portions on opposite sides of the body and located below said door openings, the ends of said cross brace bridging the side walls of the channel section threshold structures and being secured thereto.

30. An automobile body having a skeleton frame to take the stresses and strains, and a sheet metal shell applied to the exterior surface of the frame to give external appearance to the body, said frame built up of sheet metal stampings integrally secured together to form side members, said side members including longitudinally extending portions of substantially channel shape in cross section, and individual cross members connecting the side members, the ends of at least one of said cross members bridging the mouth of the channel of said longitudinally extending portions and being secured to its side walls.

31. In an automobile body structure, outer and inner sheet metal panels together forming the frame and shell of a body wall, each having spaced integral vertical portions and longitudinal portions connecting the spaced vertical portions, and the adjacent vertical and horizontal edges of said outer and inner sheet metal stampings being flanged and secured together to form door posts and horizontal connecting means therefor.

32. In an automobile body structure, outer and inner sheet metal panels together forming the frame and shell of a body wall, each having corresponding integral vertical and horizontal portions, the adjacent edges of said outer and inner sheet metal panels being flanged and secured together to form door posts and thresholds connecting said posts, one of said outer and inner panels being flanged in the margin of the door opening to substantially the full depth of the door.

33. In an automobile body structure, an outer sheet metal shell and a supporting sheet metal skeleton frame therefor, each having spaced integral vertical side portions and longitudinal portions connecting the spaced vertical portions, the vertical and longitudinal portions of the shell and frame being substantially coextensive with each other, and the adjacent vertical and horizontal edges thereof being flanged and secured together to form door posts and connecting members therefor.

34. In an automobile body structure, an outer sheet metal shell having integral side and back portions and door openings in the side portions, a supporting sheet metal skeleton frame, having integral vertical side portions and flaring vertically and rearwardly at the rear of a door opening adjacent the juncture with the vertical portions, and secured to the side portions of the outer shell adjacent the door openings, and a cross brace connecting the side portions on opposite sides of the body and located below the door openings.

35. An automobile body having a skeleton frame to take the stresses and strains, and a shell applied to the exterior surface of the frame to give external appearance to the body, said frame built up of sheet metal stampings integrally secured together to form side members vertically widened for some distance at the rear of a door opening, and individual cross members connecting the side members.

36. An automobile body having a skeleton frame to take the stresses and strains, and a shell applied to the exterior surface of the frame to give external appearance to the body, said frame built up of sheet metal stampings integrally secured together to form side members flaring vertically and rearwardly for some distance and then extended vertically and defining the rear edge of a door opening, said flaring portion being of substantially channel cross section along its upper edge, and individual cross members connecting the side members.

37. An automobile body having a skeleton frame to take the stresses and strains, and a shell applied to the exterior surface of the frame to give external appearance to the body, said frame built up of sheet metal stampings integrally secured together to form side members, and individual cross members connecting the side members, one of said cross members having a vertically extending web portion forming an element of the seat structure and being flanged to provide a floor board support.

38. An automobile body having a skeleton frame to take the stresses and strains, and a shell applied to the exterior surface of the frame to give external appearance to the body, said frame built up of sheet metal stampings integrally secured together to form side members, the side members being extended forwardly into the cowl and provided with a vertically and forwardly flared portion providing a toe board support, and individual cross members connecting the side members.

39. An automobile body having a skeleton frame to take the stresses and strains, and a shell applied to the exterior surface of the frame to give external appearance to the body, said frame built up of sheet metal stampings integrally secured together to form side members having vertically extending portions of channel formation bridging the space between the door openings, and individual cross members connecting the side members.

40. An automobile body having a skeleton frame to take the stresses and strains, and a shell applied to the exterior surface of the frame to give external appearance to the body, said frame built up of sheet metal stampings integrally secured together to form side members having vertically extending portions of channel formation, the channels presenting inwardly and having rabbeted side walls and bridging the space between door openings, and individual cross members connecting the side members.

41. In an automobile body structure, an outer sheet metal shell and a supporting sheet metal skeleton frame therefor, each having integral vertical side portions, the adjacent vertical edges of said portions being flanged and secured together and the flange of the frame being extended by an angle portion to form door post structures.

42. An automobile body having a skeleton frame to take the stresses and strains, and a shell applied to the exterior surface of the frame to give external appearance to the body, said frame built up of sheet metal stampings integrally secured together to form side members, said structure comprising posts having an inwardly and forwardly facing recess in their forward portions, and individual cross members connecting the side members.

43. In an automobile body structure, an outer shell having integral side and back portions and door openings in the side portions, a supporting skeleton frame having integral vertical side portions secured to the side portions of the outer shell adjacent the door openings, said side portions of the frame comprising channel members presenting longitudinally, and a cross brace connecting the side portions on opposite sides of the body and located below said door openings.

44. An automobile body having a sheet metal skeleton frame to take the strains and stresses, said frame having integral longitudinally extending side portions and vertically extending portions to form door posts, and a sheet metal shell having corresponding and substantially coextensive side and vertical portions applied to the exterior surfaces of said frame side and vertical post portions to give external appearance to the body, the corresponding frame and shell side and vertical portions on opposite sides of the body being respectively connected together and to each other along their adjacent edges to form a unitary structure.

45. An automobile body having a sheet metal skeleton frame to take the strains and stresses, said frame having longitudinally extending side portions and vertically extending portions to form door posts, and a sheet metal shell having corresponding side and vertical portions applied to the exterior surfaces of said frame side and vertical post portions to give external appearance to the body, the corresponding frame and shell side and vertical portions on opposite sides of the body being of arched and curvilinear form and of angle section in their mating edges and being respectively connected together and to each other along their mating edges to form a unitary structure.

46. In an automobile body structure, outer and inner sheet metal panels together forming the frame and shell of a body wall, each having an integral vertical portion emanating from a longitudinal portion, and the adjacent vertical and horizontal edges of said outer and inner sheet metal stampings being flanged and secured together to form door posts and a longitudinal member extending from the base of said door post.

In testimony whereof I hereunto affix my signature.

JOSEPH LEDWINKA.